United States Patent [19]
Jones et al.

[11] Patent Number: 6,108,314
[45] Date of Patent: Aug. 22, 2000

[54] METHOD, SUBSCRIBER DEVICE, WIRELESS ROUTER, AND COMMUNICATION SYSTEM EFFICIENTLY UTILIZING THE RECEIVE/TRANSMIT SWITCHING TIME

[75] Inventors: Wesley Stuart Jones, Palatine; William A. Payne, III, Glen Ellyn, both of Ill.

[73] Assignee: Motorola, Inc., Schaumburg, Ill.

[21] Appl. No.: 09/143,714

[22] Filed: Aug. 31, 1998

[51] Int. Cl.[7] .................................................. H04L 5/14
[52] U.S. Cl. ........................................ 370/294; 370/401
[58] Field of Search ................................... 370/294, 276, 370/277, 278, 285, 310, 312, 328, 329, 336, 337, 338, 347, 356, 360, 375, 378, 379, 380–383, 401, 412, 420, 422, 427, 428, 442, 458, 389, 392; 455/464, 500, 517, 62

[56] References Cited

U.S. PATENT DOCUMENTS

| | | | |
|---|---|---|---|
| 5,239,545 | 8/1993 | Buchholz | 370/348 |
| 5,303,234 | 4/1994 | Kou | 370/442 |
| 5,515,379 | 5/1996 | Crisler et al. | 370/347 |
| 5,517,504 | 5/1996 | Tran et al. | 370/347 |
| 5,572,528 | 11/1996 | Shuen | 370/402 |
| 5,594,738 | 1/1997 | Crisler et al. | 370/348 |
| 5,706,274 | 1/1998 | Angelico et al. | 370/445 |
| 5,724,346 | 3/1998 | Kobayashi et al. | 370/329 |
| 5,742,590 | 4/1998 | Lin et al. | 370/252 |
| 5,781,547 | 7/1998 | Wilson | 370/395 |

*Primary Examiner*—Dang Ton
*Assistant Examiner*—Phirin Sam
*Attorney, Agent, or Firm*—Kenneth A. Haas

[57] ABSTRACT

The present invention provides a subscriber device (10), method (1000, 1500), wireless router (30), and communication system (100). The communication system (100) includes at least one subscriber device (10) having a message generator (1612) for generating a message which includes an indicator of a receive/transmit switching time, and the wireless router (30) for communicating with at least one subscriber device, the wireless router having a scheduler (902), optimizer (904), and an allocation map generator (906), wherein the wireless router (30) prepares an efficient and optimized channel allocation map for transmission to the subscriber device (10) taking into account the indicator of the receive/transmit switching time for the subscriber device (10) and wherein the map indicates at least one allocated transmit time, in a form of a block, having a beginning and an end, for transmission by the subscriber device following a receive time.

7 Claims, 7 Drawing Sheets

| | FRAME TYPE | LENGTH | MAXIMUM TRANS. UNIT |
|---|---|---|---|
| 1 | MAC FRAME | VARIABLE | 1500 BYTES |
| 2 | ATM | 53 BYTES | |
| 3 | MPEG.2TS | 188 BYTES | |
| ⋮ | ⋮ | ⋮ | ⋮ |
| N | — | — | — |

| COUNT (BYTES) | VIRTUAL CIRCUIT ID | RECEIVE OR TRANSMIT | FRAME TYPE | LENGTH |
|---|---|---|---|---|
| 010 | 48 | R | 01 | 820 BYTES |
| 831 | 52 | R | 02 | 3 CELLS |
| 990 | 26 | R | 02 | 1 CELL |
| 1044 | 105 | R | 03 | 2 PACKETS |
| 1421 | 48 | T | 02 | 410 BYTES |
| 1832 | 26 | T | 02 | 5 CELLS |
| 2098 | 105 | T | 03 | 1 PACKET |

METHOD, SUBSCRIBER DEVICE, WIRELESS ROUTER, AND COMMUNICATION SYSTEM EFFICIENTLY UTILIZING THE RECEIVE/TRANSMIT SWITCHING TIME

FIELD OF THE INVENTION

This invention generally relates to wireless communication systems, and more particularly to providing efficient information throughput in wireless communication systems by taking into account the receive/transmit switching times, i.e., the turn-around times of the subscriber devices in the wireless communication system.

BACKGROUND OF THE INVENTION

Subscriber devices are used as parts of wireless communication systems. Inherent in the operation of time division duplex (TDD) devices is a fundamental "turn-around" time which is the amount of time it takes for the devices to switch from a receive to a transmit mode and vice versa. Because of the turn-around time an amount of inefficiency is introduced into the speed of operation of the communication system. Base stations and infrastructure equipment for the wireless service are typically much more complex than the subscriber devices; therefore, the subscriber devices normally have larger turn-around times than the infrastructure equipment and the operation of the system is limited by the slowest subscriber device. More particularly, a guard time is set in the communication system in order to support the subscriber device with the slowest turn-around time. The speed of operation of the communication system is dependent on and determined by the turn-around time of the slowest subscriber device in the communication system. Therefore, the capacity of information throughput of the communication system is greatly reduced.

Thus, there is a need for a wireless communication system that provides a more efficient and greater information throughput by taking into account the turn-around time of the subscriber devices of the wireless communication system.

GLOSSARY OF ACRONYMS

ASIC—application specific integrated circuit;
FCS—Frame check sequence
FEC—forward error correction
MAC—medium access control
MPEG—Moving Pictures Expert Group
SNMP—Simple Network Management Protocol
TCP/IP—Transmission Control Protocol/Internet Protocol
USB—Universal Serial Bus
TDD—Time Division Duplex

DETAILED DESCRIPTION OF THE PREFERRED EMBODIMENT

Figure 1:
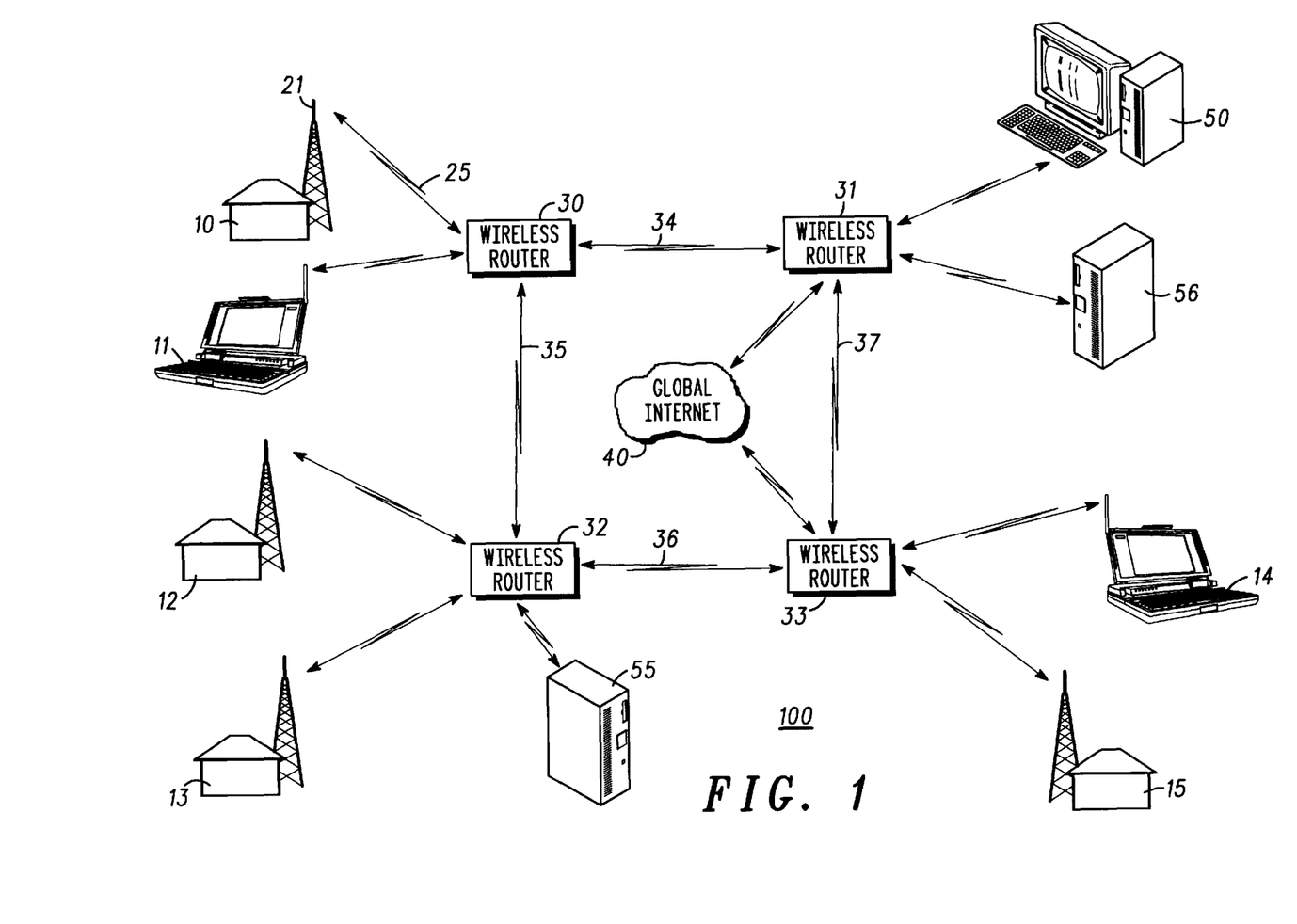
FIG. 1 is an overview diagrammatic representation of a wireless communication system in accordance with a preferred embodiment of the present invention.

FIG. 1 illustrates a wireless communication system in accordance with the preferred embodiment of the present invention. It comprises fixed subscriber devices 10,12,13, and 15, in-premises systems in residential homes or small business buildings and mobile subscriber devices 11 and 14. The subscriber device 10 is in communication with a roof-mounted antenna 21. The antenna 21 communicates over a broad-band radio channel 25 with a wireless router 30. Users of mobile devices utilize compact or portable computers with attached subscriber devices with integrated antennas to communicate over the broad-band radio channel 25 with a wireless router 30. A number of such wireless routers are illustrated, including wireless routers 31, 32, and 33. In the configuration shown, the wireless routers 30 to 33 are in communication with each other over radio links 34, 35, 36, and 37. Some of the wireless routers are connected to a global Internet network 40. In the illustrated case, wireless routers 31 and 33 are connected to the global Internet network 40.

In alternative (no less preferred) embodiments, each of the wireless routers 30, 31, 32, and 33 is connected directly to the global Internet 40. In alternative embodiments, the links 34, 35, 36, and 37 are replaced with land-based links such as a fiber distributed data interface (FDDI) network or 100Base-X links or an asynchronous transmission mode (ATM) network. Other suitable connections are possible, including satellite links.

Connected to at least one of the wireless routers (in the illustrated case, wireless router 31) is a node station in the form of a network management module 50. Some (and preferably all) of the wireless routers 30–33 have a content server. Wireless router 32 is illustrated as having content server 55 connected directly thereto. Wireless router 31 is illustrated as having content server 56 coupled thereto.

In operation, a physical link is established between subscriber device 10 and wireless router 30 for transfer of data of various types. The establishment of a physical connection over the broad-band radio channel 25 is described in greater detail below and consists, in general terms, of identification by the subscriber device 10 of a pilot channel transmitted by the wireless router 30, identifying to the subscriber device 10 the existence of the wireless router and services or capabilities available from the wireless routers. Using the pilot channel as a guide, the subscriber device 10 transmits a request to the wireless router requesting registration during an idle portion of the TDD frame. This request is forwarded by the wireless router over link 34 to network management module 50. Network management module 50 responds to the request for registration and authorizes wireless router 30 to initiate communications with the subscriber device 10. The manner and extent of communication enabled depends on the level of service to which the subscriber responsible for the subscriber device 10 has subscribed in the network management module 50.

In a similar manner, other subscriber devices 11 to 15 establish communication with their local wireless routers. Wireless routers can route communications directly from one subscriber device to another subscriber device served by the same router, or can link those communications over one of the links 34, 35, 36, and 37 to an adjacent or remote wireless router in the wireless communication system, for onward communication to another subscriber device. Additionally and alternatively one of the wireless routers (e.g. wireless router 31) can route communications from a subscriber device into the global Internet network 40.

The content servers 55 and 56 perform operator services and perform caching of web or other content that is either frequently required by subscriber devices served by that wireless router, or is likely to be required by a subscriber device or simply caching all suitable traffic that may possibly be required again by a subscriber device.

Figure 2:
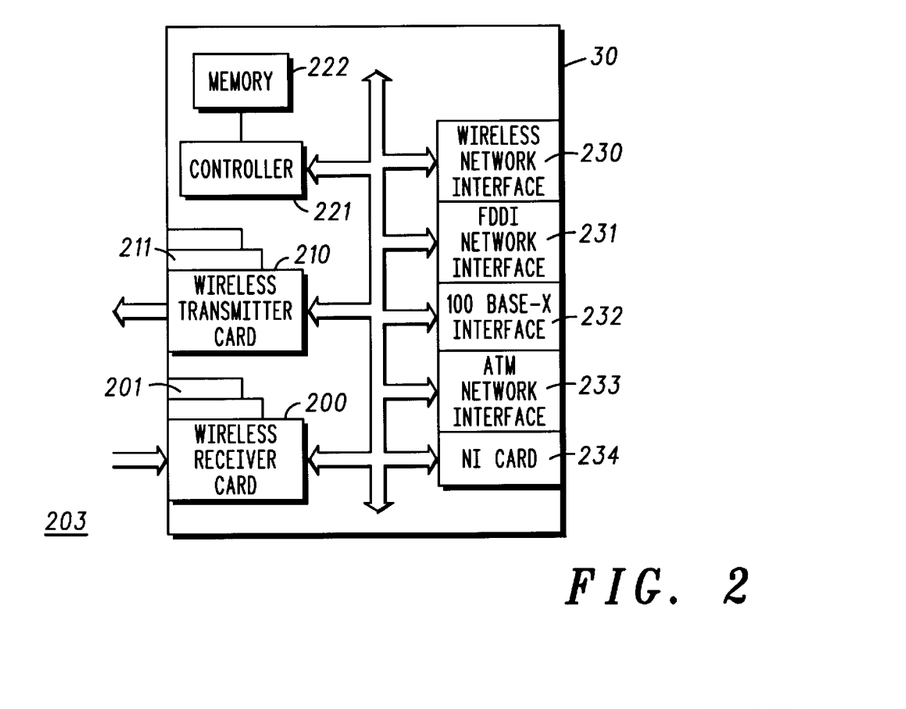
FIG. 2 is a block diagram illustrating details of a wireless router of the wireless communication system of FIG. 1.

Referring now to FIG. 2, the description of the system hardware continues with an illustration of the wireless router 30. The wireless router 30 comprises multiple wireless receiver cards 200, 201, etc. and multiple wireless transmitter cards 210, 211, etc. There is one transmitter card and one receiver card for each radio band connecting the wireless router 30 with the subscribers that it serves. Suitable radio bands are in the 2.5 GHz radio band, the 5 GHz radio band, the 28 GHz radio band and other high frequency bands. It is not necessary for the wireless router 30 to serve multiple radio bands. Any one of these radio bands will suffice for the system. Accordingly, at a minimum there is just one wireless transmitter card and one wireless receiver card.

The transmitter and receiver cards 210, 211, 200 and 201 are connected to a wireless router bus 202. Also connected to the bus are a controller and one or more interface cards for linking the wireless router to other wireless routers or to the global Internet or other networks. These interface cards include a wireless network interface 230, a FDDI network interface 231, a 100Base-X interface 232, an ATM network interface 233, and another network interface card 234.

The network interface cards 233 and 234 perform the tasks of ATM layer segmentation and reassembly (SAR), and forwarding, or layer 3 routing and forwarding, with or without bridging. Packets or frames are transmitted to the appropriate network after these functions are performed.

The wireless router 30 has a central controller 221 with a memory 222. Each of the cards 200 or 210 or 221 or 230 to 234 also has a processor or controller (e.g. a microprocessor or an ASIC). The various controllers or processors have loaded therein software that performs certain functions as follows. The controller 221 performs routing protocols, signaling functions, MAC protocol scheduling and spectrum management and it includes SNMP agents. The wireless transmitter cards 210 and 211 perform MAC protocol formatting and processing and perform spectrum management. The wireless receiver cards 200 and 201 perform MAC protocol formatting and processing, spectrum management, IP, MPEG and/or ATM forwarding. The wireless network interface 230 performs MPEG forwarding and spectrum management for the link 34. The FDDI network interface 231 performs IP forwarding, as does the 100Base-X interface 232. The ATM network interface 233 performs IP forwarding, ATM forwarding and MPEG forwarding.

In operation, different types of data need to be transferred between the various interface cards of the wireless router 30 and the various in-home devices. For example, Internet Protocol (IP) needs to be transferred between the computer devices (not shown) in the subscriber devices and either the wireless network interface card 230 or the FDDI network interface 231 or the 100Base-X interface 232. At the same time, MPEG or other compressed video needs to be transferred between an audio visual transport card (not shown) or the video processor (not shown) of the subscriber device and either the wireless network interface card 230 or the ATM network interface card 233. Simultaneously, ATM cells may need to be transferred between the ATM network interface card 233 and one of the other interface cards, for example a USB interface (not shown) or an in-home bus transceiver (not shown).

All these data types (and other data types either existing or not yet devised) need to be supported simultaneously, but with differing requirements, for example, differing quality of service (QoS) requirements. For example, it may be important for real-time video to be transferred through the system with low delay variation so as to result in minimum jitter of video images. Similarly, it is desirable for telephone voice traffic to be transferred through the system with minimum delay so that telephone conversations are not disrupted by excessive delays in the 2-way connection. On the other hand, Ethernet and IP data packets can generally tolerate longer delays in end-end transfers. The challenge is to support all these high bandwidth, high data rate packet types on a common radio channel, which inherently has limited bandwidth, for example, typically less bandwidth than an optical fiber or coaxial cable.

A new subscriber device that is not previously registered with the network management module 50 goes to the known downstream broadcast pilot channel upon power up. This downstream pilot channel periodically broadcasts a spectrum description map of all the channels/carriers available in the entire spectrum, as well as parameters associated with those channels, including cutoff frequencies, modulation, upstream or downstream channel times, timing information for synchronizing to the TDD frame, etc. The downstream frame format comprises a flag, followed by a number of controlled bits, followed by the downstream spectrum description map, followed by FCS or FEC coding and finally a flag, after which the frame repeats. There may be varying degrees of error detection and correction based on service needs across the component channels. There should at least be protection for the frame header, using a check sequence.

On a periodic basis the network management module 50 sends a message through wireless router 31 and through wireless router 30 to subscriber device 10 served by the wireless router 30 (and indeed to all subscriber devices served by all wireless routers) inviting new unregistered subscriber devices to register themselves with the system. This request is sent on the downstream pilot channel. A new subscriber device receiving this invitation can match itself up with the channel rate, modulation, and timing information described in the downstream spectrum description map. Alternatively, it can choose to try to introduce a new channel into the spectrum, specifying its own parameters for the new channel. The message from the subscriber device to the wireless router 30 is over a shared upstream segment of the TDD frame.

Upon receipt by a wireless router 30 of an acknowledgment from network management module 50, the wireless router transmits to the requesting subscriber device a set of channel parameters defining a channel that is being allocated to that subscriber device. The set of channel parameters is transmitted in the downstream pilot channel. The channel parameters transmitted to the requesting subscriber device include the frequency range for the channel allocated, and define the modulation scheme and the data type being supported.

The above described initialization procedures are controlled and operated by software located in the subscriber device 10 and the controller 221 of the wireless router 30, as well as software located in the network management module 50. In this manner, a channel is established between the subscriber device 10 and the wireless router 30. The memory 222 of the wireless router 30 stores, among other information, receive/transmit switching times for different subscriber devices, as is described in greater detail below.

Figure 3:
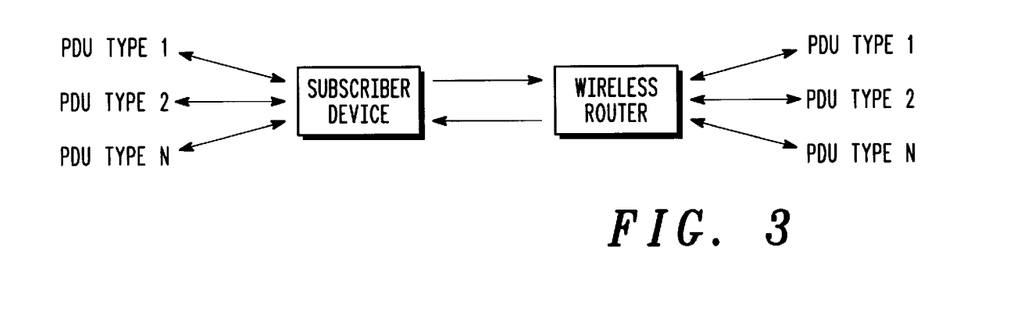
FIG. 3 is a schematic diagram illustrating traffic passing between the subscriber device and the wireless router.

Referring now to FIG. 3, a schematic illustration is given showing how various packet data units of N different types are multiplexed and de-multiplexed between the subscriber device 10 and the wireless router 30. Packet data units (PDUs) of type 1, type 2 and type N are fed into the subscriber device 10 and multiplexed onto the radio channel 25, received at the wireless router 30 and de-multiplexed at the wireless router 30 into PDU's of type 1, type 2 and type N. Similarly, PDU's are received at the wireless router in N different types, are multiplexed onto the radio channel 25, received at the subscriber device 10 and demultiplexed into PDU's of type 1, type 2 and type N. Different PDU's are distinguished in type by either: (a) being of different fixed lengths, e.g. ATM cells and MPEG-2 transport packets, which are examples of fixed length packets; or (b) being of fixed and variable length, for example, ATM cells and Ethernet MAC frames, where ATM cells are fixed in length and Ethernet MAC frames are variable in length. The arrangement described supports packet data unit types of differing fixed lengths, as well as packet data units of fixed length side-by-side with packet data units of variable length.

The channel is a TDD channel consisting of downstream and upstream time segments for access to the channel. At known intervals, described in the pilot channel, the TDD frame will have an idle section where clients can request new or additional access to the upstream channel.

Different types of frames are multiplexed on the downstream in a time divided manner. Each frame type has a number of bytes associated with that frame type or (in the case of a variable length frame type) a maximum size. A table of these frame types is included in the channel allocation map which is sent periodically on the downstream channel (including the initialization channel) from the wireless router 30 to the subscriber device 10, 11, etc.

Figure 4:
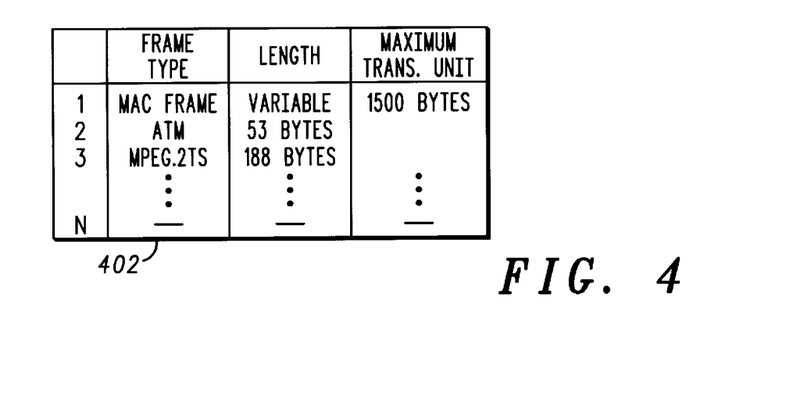
FIG. 4 illustrates a table of frame formats stored at a wireless router and periodically transmitted by the wireless router.

Referring now to FIG. 4, an example of a table of frame types and their respective lengths is shown. The frame type is defined on the downstream broadcast control channel. Some of the frame types are individually known in existing communication systems and three such types are shown in column 402 in FIG. 4. The illustrated types are MAC frame, ATM cell and MPEG-2 packets. In addition, newly defined formats can be included in the table. The definitions of the various formats of the different types of frame are periodically transmitted on the broadcast control channel and (less frequently) they are transmitted on the downstream data channels. As illustrated in FIG. 4, a MAC frame is variable in length up to a maximum of 1500 bytes, an ATM cell has a length of 53 bytes and a MPEG-2 TS packet has a length of 188 bytes.

Time division multiple access is used on the upstream segment of the TDD frame. A subscriber device requests to transmit a number of frames (and frame types) to the node station. The node station (either wireless router 30 or an upstream node) processes the request and acknowledges and either grants or denies the request on the associated downstream channel. When a request for a channel is granted by the wireless router 30, the controller 221 of the wireless router 30 adds an indication of the newly granted channel in the channel allocation map that it periodically transmits downstream (i.e. to the subscriber device). The map describes the allocation of bandwidth over time and describes grants for subscriber units to transmit upstream. The subscriber device (described in greater detail below with reference to FIG. 12) receives and stores this channel allocation map in a memory and it has a microprocessor that controls start and end times of transmission of a transmitter according to allocated times in the channel allocation map.

An upstream request can occur either on the upstream data channel during the idle portion of the TDD frame as an individual message, or on a separate request channel upstream or by piggybacking the request onto a frame that is already in transit upstream.

Hosts that are active are expected to stay synchronized by observing the downstream allocation maps and by updating their byte count (local) to coincide with the frames being delivered upstream. The byte count is maintained in a counter in the subscriber device. The periodic byte count also helps in a fading environment since it provides a mechanism for the subscriber device to quickly update its local byte count.

When a subscriber device requires service in terms of requiring an allocation of bandwidth, or when it requires additional bandwidth, or when the bandwidth allocated to that subscriber device exceeds the subscriber device's updated requirements, the subscriber device makes a new request from the wireless router 30, and makes this request based on quality of service (QoS) definitions. The QoS definitions include a number of QoS parameters, such as minimum bandwidth, maximum latency, maximum delay, etc. The wireless router 30 attempts to allocate a channel to the subscriber device 10 in a manner that will most closely match the requested QoS definition. Whether the wireless router is able to exactly match the requested QoS definition depends upon the degree of loading of the system and other factors.

Guaranteed bandwidth, maximum delay and maximum delay variation and frame delay variation are among the parameters that can be specified. Based on the parameters specified in the request message the host is polled by the subscriber device on a periodic basis corresponding to a "service contract."

Figure 5:
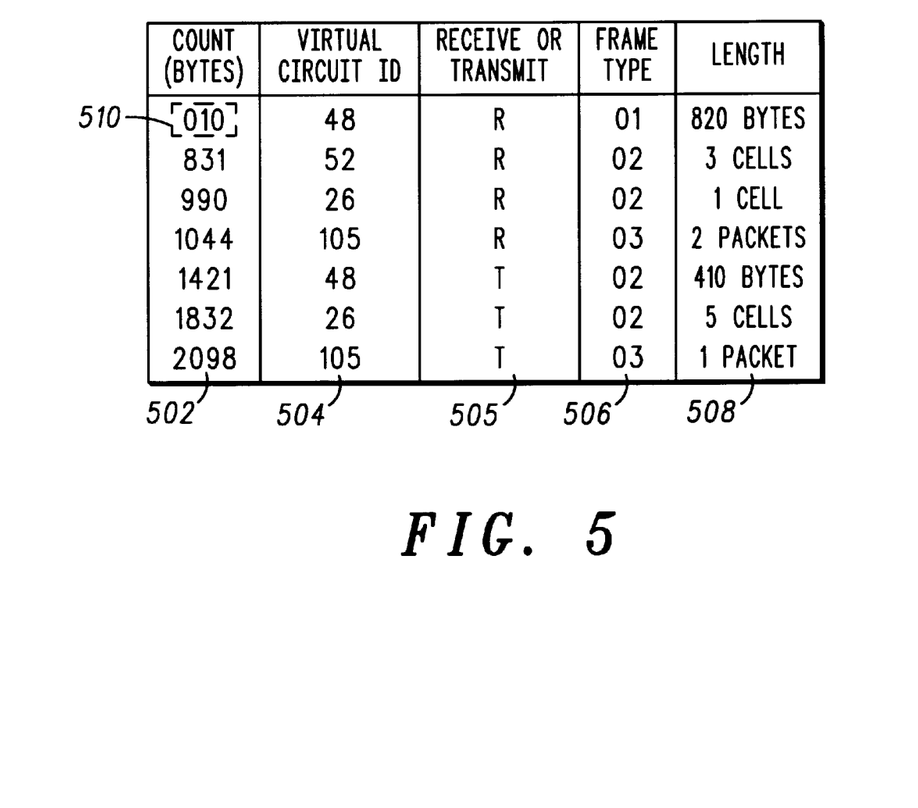
FIG. 5 is an illustration of an allocation map periodically transmitted by the wireless router.

On the downstream segment of the TDD frame, there is a channel allocation map that specifies when subscriber device can and should receive on the downstream segment and transmit on the upstream segment of the TDD frame. FIG. 5 illustrates an example of a channel allocation map transmitted by the wireless router 30. In column 502 there is a byte count. In column 504 there is a session ID identifier. In column 505 there is a receive or transmit identifier. This signifies if the subscriber should be receiving from or is granted permission for transmitting on the channel. In column 506 there is a frame type, and in column 508 there is a length indicator. In operation, the column 502 need not be transmitted, because the information contained therein is derivable from the initial bit count 510 and the information in columns 506 and 508. It is merely necessary for the subscriber device to be synchronized to the count of the wireless router, that is to say for the subscriber device to have prior knowledge of the byte count of the wireless router for any given item in a downstream channel allocation map.

To achieve this synchronization, a byte count is sent periodically downstream to the subscriber devices. This count is treated with priority in that it is immediately removed from the link and used to update the subscriber device's local byte count. This byte count along with a fixed delay component is used for the subscriber device to transmit on the upstream channel. The fixed delay is calculated during registration and corresponds to the relative distance between the subscriber device and the router base station. Thus the upstream transmissions can be synchronized to the downstream byte counts. The byte count can be sent in the downstream channel allocation map or as an explicit management type message.

Each session ID in column 504 is unique for the entire autonomous system, i.e. it uniquely defines the connection between the subscriber device or other subscriber device and an edge router in the system. If a subscriber device roams to another wireless router (e.g. from wireless router 30 to wireless router 32), the same session ID will be used for the connection.

In the example given, frame type 01 is a MAC frame, frame type 02 is an ATM cell and frame type 03 is an MPEG packet. Other frame types may be indicated, up to a maximum of 16 different frame types. The frame types fall into three categories: different types of network layer frame (e.g. ATM/MPEG/IP); different types of MAC layer operational frames (e.g. request/ack/grant); and one management frame. With 16 possible frame types and four used for MAC layer operational frames and a management frame, there remain 12 frame types that can be used to support up to 12 different network layer frame types (of which 3–4 are described in this text). Column 508 indicates the length of the particular frame (in the case of variable length frame types) or the number of cells or packets (in the cases of fixed length frame types).

From the information in columns 504, 506 and 508, and from the start byte count 510, any subscriber device can identify the start byte count of any frame. Thus, for example, the three ATM cells on the virtual circuit ID 52 begin with byte count 831, which is the byte which immediately follows the final byte of the variable frame that has session ID 48 (which starts at byte count 010 and is 820 bytes in length). Note that an ATM cell is 53 bytes in length, so that it is not necessary in column 508 to indicate the number of bytes in the ATM cell. Each subscriber unit has prior knowledge of the number of bytes in an ATM cell or the number of bytes in an MPEG packet and, with this knowledge and the knowledge of the number of cells or packets in a given frame, the subscriber unit is able to calculate the byte count of column 502 for the start of the next frame.

A subscriber device receiving the channel allocation map of FIG. 5 monitors the virtual session IDs to look for those that are associated with that subscriber device. Based on the synchronization to a common byte count and the information in the channel allocation map, each subscriber device knows when to transmit on the upstream segment of the TDD frame. An upstream node invites subscriber devices wishing to transmit on the upstream channel to transmit upstream request messages during idle time slots or frame periods. Subscriber devices contend on those requests and are allocated upstream frame slots which are then indicated to the subscriber devices on the channel allocation map. Frames or cells are passed on to the upstream nodes or the network management module by the wireless router and any intermediate routers.

The present invention provides a novel approach to increase capacity and efficiency in the transmission rate of information between the wireless router and the subscriber devices. In the present invention, each of the subscriber devices 10, 11, etc. reports at least one value to the wireless router that is indicative of the receive/transmit switching time of that subscriber device. The receive/transmit switching time of each subscriber device is either the receive-to-transmit switching time or the transmit-to-receive switching time and is hereinafter referred to as the "turn-around time." It must be noted that the receive-to-transmit switching time may be different from transmit-to-receive switching time for each subscriber device. The wireless router (for example wireless router 30) serving a set of subscriber devices utilizes the turn-around times of each subscriber device of the set in preparing a channel allocation map for transmission to the subscriber devices of the set. The channel allocation map provides allocated times for each subscriber device to receive information from and transmit information to the wireless router. The channel allocation map is prepared by taking into account the time it takes for each subscriber device served by the wireless router to receive information from the wireless router and switch to a transmit mode or the time it takes for each subscriber device to switch from a transmit mode to a receive mode.

Figure 6:
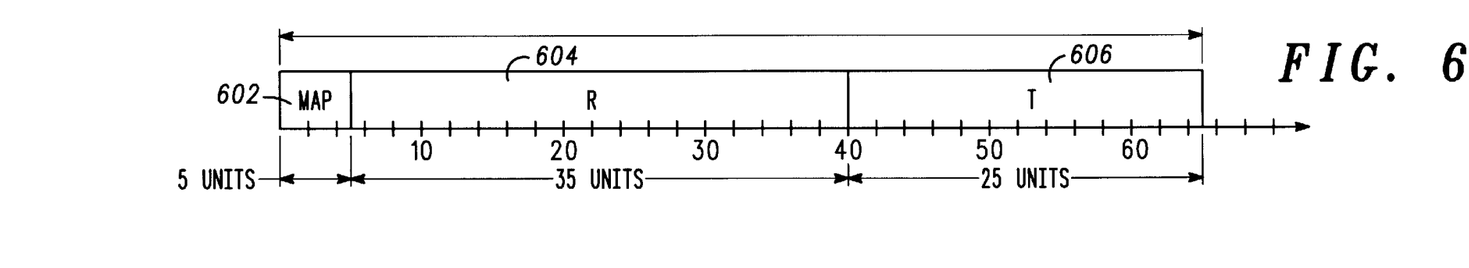
FIG. 6 is an exemplar illustration of a fixed frame arrangement providing the allocation map and the allocated receive and transmit times for subscriber devices in accordance with the present invention.

FIG. 6 is an exemplar illustration of a fixed frame arrangement providing the channel allocation map and the allocated receive and transmit times for subscriber devices in accordance with the present invention. FIG. 6 shows a frame 601 having a channel allocation map 602, a subscriber device/client receive time portion 604, and a subscriber device/client transmit time portion 606. It should be noted that the terms "subscriber device" and "client" will be used interchangeably hereinafter. The arrangement shown in FIG. 6 is referred to as a fixed frame arrangement because the allocated receive times for all the associated clients from the wireless router are in a sequential and contiguous manner followed by the allocated transmit times for each of the same, in other words the TDD boundary has a fixed position in the frame. Referring to FIG. 6, it is contemplated that the duration of the frame is 65 units of time. The units of time may be a multiple of microseconds or any other desired unit of time. The operation and usage of the fixed frame arrangement is more fully described in the following Example:

EXAMPLE 1 ASSUMPTIONS

1. It takes 5 units of time to send the channel allocation map.
2. The frame 601 is structured with 35 units of downstream access and 25 units of upstream access. (This is the ratio for a duplex in a TDD system). The above downstream and upstream access values have been chosen based on the assumption that more traffic will be sent to the clients than received from the clients. Some systems have fixed TDD boundaries, i.e., every frame has the same ratio, while other systems have boundaries which may vary on a frame by frame basis.
3. There are four clients, referred to hereafter as Clients 1–4 or C1, C2, C3, and C4.
4. Best Effort Delivery traffic will always get at least 5 units of time in both the transmit and receive portions of the frame 601. (In this case 10 units of time from a total of 65 units of time in the frame).
5. The guard time t is small compared to the frame size. (Generally the guard time is approximately equal to or less than a packet transmission time.)
6. The turn-around times for the clients are:

C1 has a turn around time of 4 units
   C2 has a turn around time of 4 units
   C3 has a turn around time of 6 units
   C4 has a turn around time of 2 units 7. The priority Queues are set up in the following manner:
Transmit from the wireless router (base station) (total of 18 units)
C1 is to receive 8 [un]its worth of data
C3 is to receive 5 units worth of data
C4 is to receive 5 units worth of data
Receive at wireless router (base station) (total of 18 units)
C2 has 5 units worth of data
C3 has 5 units worth of data
C4 has 8 units worth of data 8. The Best Effort Queues are set up in the following manner:
Transmit from wireless router (base station)
C1 is to receive 1 unit worth of data
C2 is to receive 3 units worth of data
C3 is to receive 4 units worth of data
C2 is to receive 4 units worth of data
C1 is to receive 1 unit worth of data
C2 is to receive 2 units worth of data
C3 is to receive 2 units worth of data
Receive at wireless router (base station)
C1 has 1 unit worth of data
C2 has 2 units worth of data
C4 has 16 units worth of data (since this is
Best effort traffic the system will only take the amount which will fit in this frame.)

Figure 7:
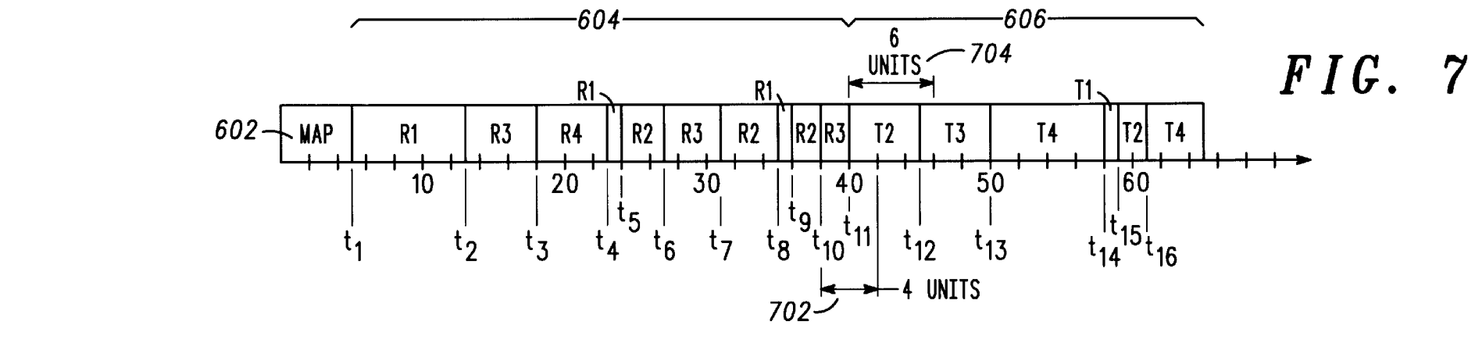
FIG. 7 is a detailed illustration of the exemplar fixed frame arrangement shown in FIG. 6 using a scheduler without guard times taken into account in a wireless communication system.

FIG. 7 is a more detailed illustration of Example 1, with the fixed frame arrangement shown in FIG. 6, using a non-optimized scheduler in a wireless communication system. Referring to FIG. 7, the channel allocation map 602 is generated by the scheduler without taking turn-around into account. This channel allocation map can never be transmitted to the associated clients, i.e., clients 1 through 4, because the allocated receive and transmit times are not accurate. The allocated receive times for clients 1 through 4 are shown as R1, R2, R3, and R4. The allocated transmit times for clients 1 through 4 are shown as R1, R2, R3, and R4. T3, and T4. As shown in FIG. 7, the allocated map occupies time t0 followed by allocated receive times according to the following table:

TABLE A

| Client No. | Start time of allocated receive times |
|---|---|
| 1 | t1 |
| 3 | t2 |
| 4 | t3 |
| 1 | t4 |
| 2 | t5 |
| 3 | t6 |
| 2 | t7 |
| 1 | t8 |
| 2 | t9 |
| 3 | t10 |

The allocated transmit times for clients 1 through 4 are according to the following table:

TABLE B

| Client No. | Start time of allocated transmit times |
|---|---|
| 2 | t11 |
| 3 | t12 |
| 4 | t13 |
| 1 | t14 |

TABLE B-continued

| Client No. | Start time of allocated transmit times |
|---|---|
| 2 | t15 |
| 4 | t16 |

The requirements of priority and duration of reception and transmission, i.e., communication between the clients and the wireless router, are determined according to the assumptions stated above. Following these requirements, the fixed arrangement shown in FIG. 7 provides a non-optimized arrangement. Referring to FIG. 7, client 2 has an allocated receive time ending at time t10 and also an allocated transmit time at time t11. As shown in FIG. 7, the turn-around time for client 2 (702) is four units of time, whereas the time interval between t10 and t11 is only two units of time in duration, which is not sufficient time for the client 2 to switch from the receive mode to the transmit mode. Therefore, the turn-around time for client 2 is violated. Similarly, the turn-around time for client 3 (704) is six units of time, whereas the time interval between t11 and t12 is only five units of time in duration which is not sufficient time for client 3 to switch from the receive mode to the transmit mode.

Figure 8:
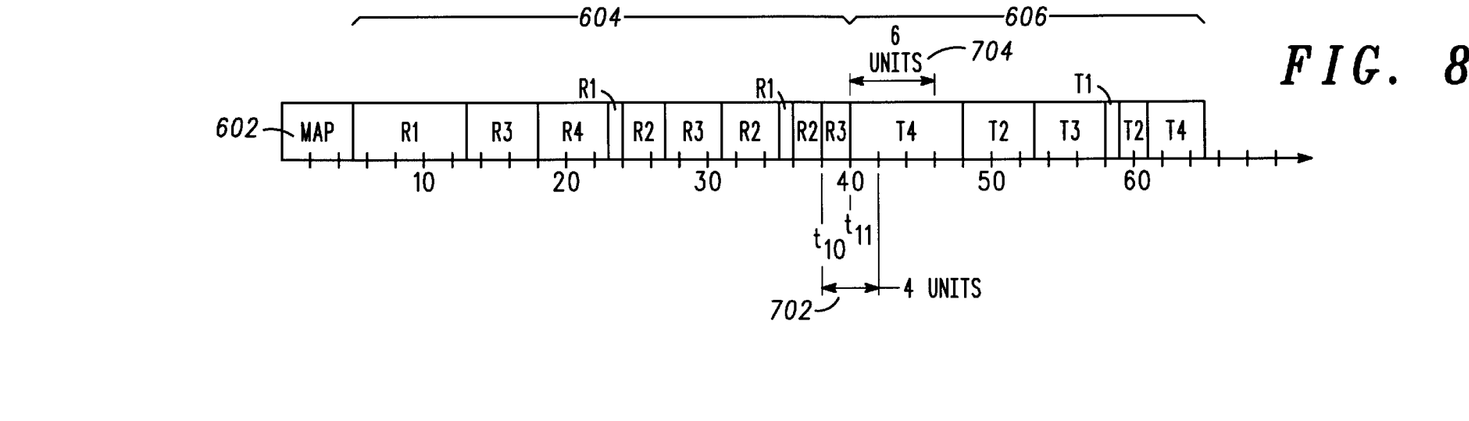
FIG. 8 is an illustration of an optimized fixed frame arrangement shown in FIG. 7 utilizing an optimizer in accordance with the present invention.

In accordance with the present invention an optimizer is utilized in conjunction with the scheduler in order to efficiently optimize the scheduling of the allocated receive and transmit times and to avoid the violation of the turn-around times of the subscriber devices. FIG. 8 is an illustration of an optimized re-arrangement of the fixed frame arrangement shown in FIG. 7, utilizing an optimizer in accordance with the present invention. Referring to FIG. 8, the start of the allocated transmit time for client 2 is postponed by the duration of the allocated transmit time for client 4. This optimized arrangement avoids the violation of the turn-around times of clients 2 and 3.

Figure 9:
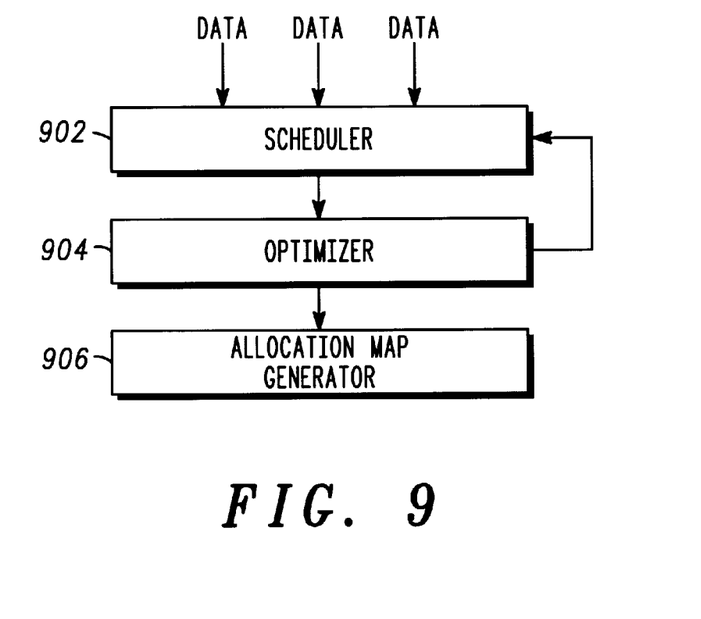
FIG. 9 is a representation of the controller of the wireless router in accordance with the present invention.

FIG. 9 is a representation of the controller 221 of the wireless router in accordance with the present invention. The controller 221 includes a scheduler 902, an optimizer 904 coupled to the scheduler 902 and an allocation map generator 906 coupled to the output of the optimizer 904. The scheduler 902 receives blocks of information and orders the blocks according to the priorities associated with each block, thereby forming a queue of blocks to be serviced, hereafter referred to as the service queue. The optimizer 904 according to the present invention receives the ordered blocks of information from the scheduler 902 and determines whether any turn-around times of the associated subscriber devices are violated. In the event a turn-around time of a subscriber device is violated, the corresponding block is stored in a temporary queue to be rechecked at a later time to determine whether it can be inserted back into the queue of the blocks without violating the turn-around time of the associated subscriber device. When the scheduling of transmission and receipt times of the blocks are optimized, then the optimized blocks are forwarded to the channel allocation map generator 906 for transmission of the channel allocation map to the respective subscriber devices. Any blocks from the temporary queue that cannot be inserted back into the queue of blocks in the optimizer are returned on path 910 to the scheduler 902 for scheduling in the next frame (if required).

Figure 10:
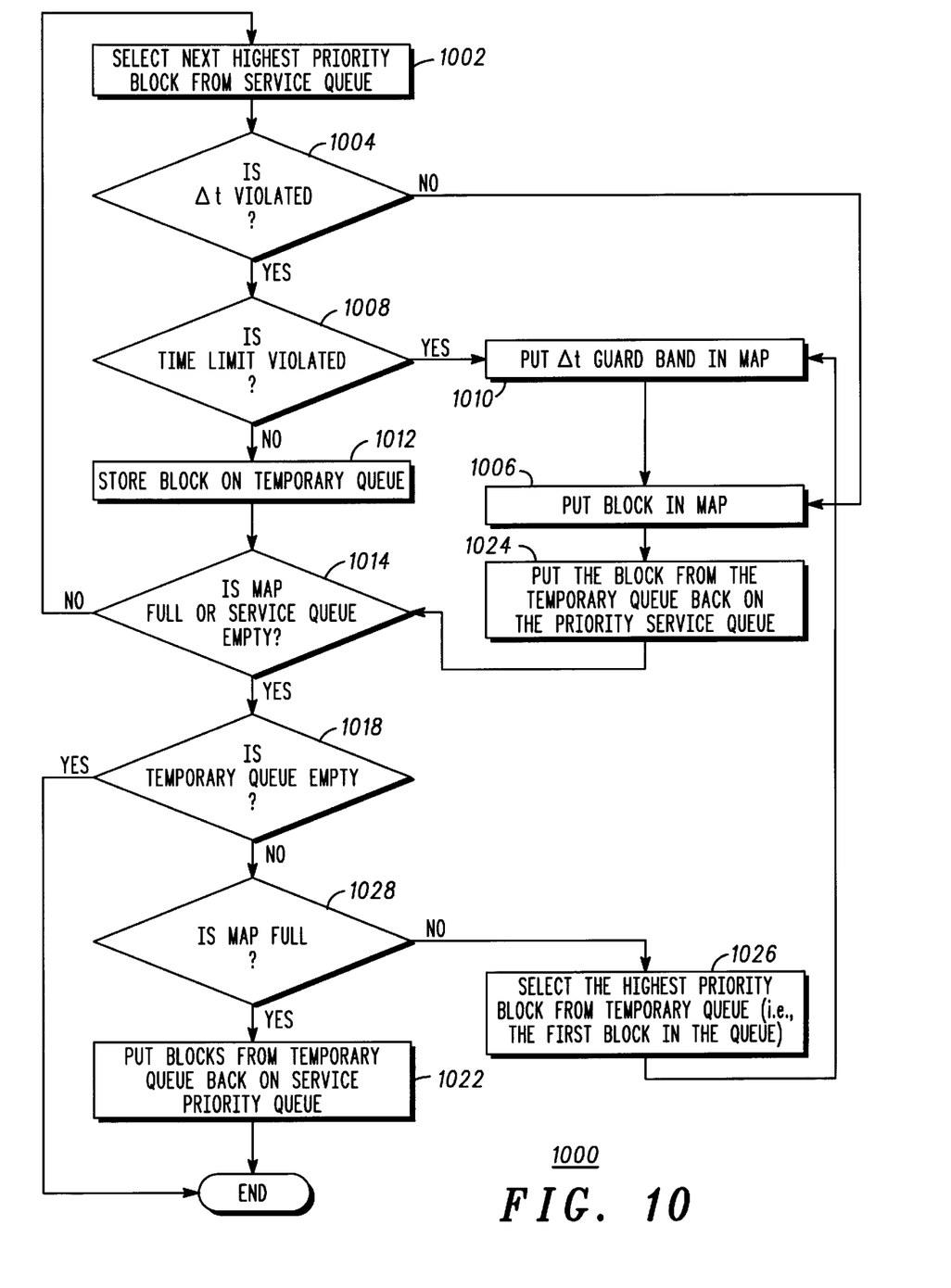
FIG. 10 is a flow chart representation of the steps of a method for providing an allocation map for transmission to the subscriber devices of the wireless communication system in accordance with the present invention.

FIG. 10 is a flow chart representation of the steps in providing an optimized allocation of the receive and transmit times for the channel allocation map in a TDD frame for transmission to the subscriber devices of the wireless communication system in accordance with the present invention. At step 1002 a block with the highest priority is selected from a service queue. At step 1004 it is determined whether the turn-around time of the subscriber device associated with the block would be violated if the block is transmitted to the associated subscriber device. If it is determined that the turn-around time is not violated, then the block is inserted in the channel allocation map at step 1006. If the turn-around time would be violated, then at step 1008 it is determined whether the time limit for preparing the channel allocation map has run out. It is to be noted that there is a finite amount of time that can be spent on preparing the allocation map or for determining what to do with a selected block, therefore when the finite amount of time is expired, then a guard band is inserted in the allocation map at step 1010 and subsequently the block is inserted in the map at step 1006. However, if the time limit for preparing the allocation map has not run out in step 1008, then the selected block is stored on a temporary queue at step 1012 and it is further inquired as to whether the allocation map is full or is the service queue empty at step 1014. In the event the allocation map is not full and there are blocks on the service queue, then the process is repeated at step 1002 by selecting next highest priority block from the service queue. Moreover, in the event the allocation map is full or the service queue is empty, then the next inquiry is whether the temporary queue is empty at step 1018. If the temporary queue is empty, then the process ends at step 1020 and the allocation map is completed and thereby optimized. If the temporary queue is not empty, then the next inquiry is whether the map is full at step 1028. If the map is full then all the blocks that could be serviced in this TDD frame have been serviced and the blocks on the temporary queue are placed back on the service queue at step 1022 and the process ends at step 1020. It should be noted that the blocks received from the temporary queue in step 1022 will be serviced on the next frame of the allocation map. If the map is not full at step 1028 then the highest priority block from the temporary queue should be serviced at step 1026. This block is in the temporary queue because it violated the turn-around time in step 1004 and therefore, a guard band must be placed in the map before this block can be serviced. At step 1010, the guard band is placed in the allocation map and then the block is serviced, i.e., placed in the map in step 1006. It should also be noted that after step 1006 (where the block is put in the allocation map), in step 1024 the block from the temporary queue is put back on the service queue.

Figures 11, 12:
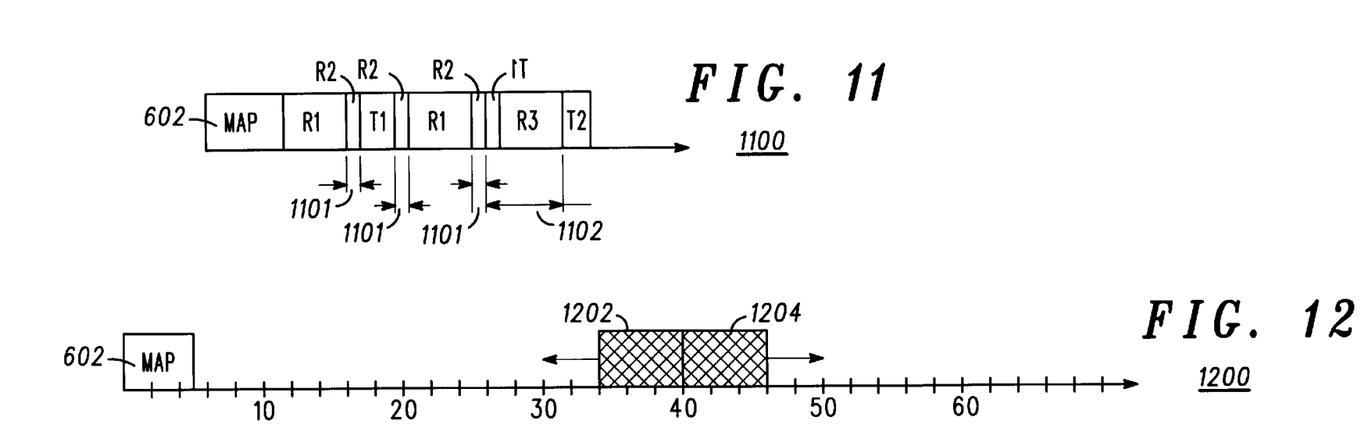
FIG. 11 is an illustration of a non-fixed frame providing the allocation map and the allocated transmit and receive times for subscriber devices in accordance with the present invention.
FIG. 12 is a second exemplar illustration of constructing the channel allocation map in a fixed frame arrangement with non-paired blocks of allocated transmission and receive times inserted into the channel allocation map in accordance with the present invention.

FIG. 11. numeral 1100, is an illustration of a non-fixed-frame arrangement providing the allocation map and the allocated transmit and receive times for subscriber devices in accordance with the present invention. In the non-fixed frame arrangement, the allocated transmit and receive times are not sequential and contiguous (in contrast with the fixed frame arrangement described above). The order by which the transmission and receive blocks are arranged is based on the turn-around time limitations of each of the subscriber devices. It should be noted that for simplicity, the non-fixed frame arrangement depicted in FIG. 11 is based on three subscriber devices in contrast to the four subscriber devices shown in FIGS. 7 and 8 for the fixed frame arrangement.

Referring to FIG. 11, at time t0 the allocation map is transmitted to the associated subscriber devices. The allocation map provides the optimized non-fixed frame arrangement of the allocated receive and transmit times to the associated subscriber devices. As described above, the optimizer 904, having received the scheduled allocated receive and transmit times for the three subscriber devices, determines an optimized arrangement by taking into account the turn-around time of the three subscriber devices. For example, numerals 1101 and 1102 represent the duration of the turn-around times for a first and a second subscriber device in the fixed-frame arrangement in accordance with present invention.

An alternate optimization method for optimizing the allocation of the allocated transmit and receive times in the TDD frame of the channel allocation map can be used in the case where the turn-around times are large with respect to the frame size. In this method transmit and receive blocks which are paired are separated inside the frame, i.e., put further from the TDD boundary thus maximizing the distance in time that each subscriber device must switch between transmit and receive or vise versa. Paired blocks refer to each pair of allocated transmit and receive times associated with each subscriber device.

Figure 13:
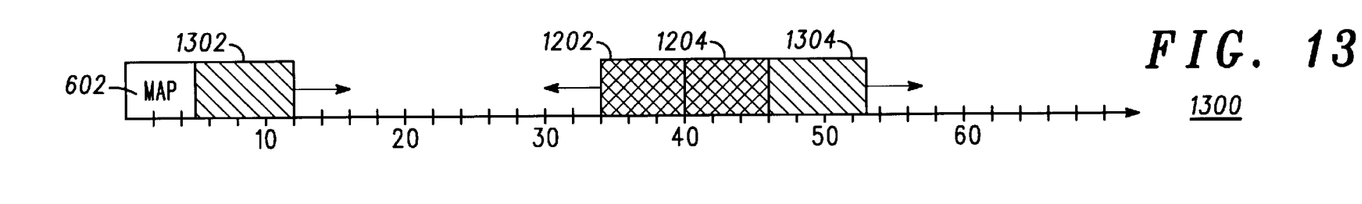
FIG. 13 is an illustration of additional paired blocks inserted into the channel allocation map of FIG. 12.
Figure 14:
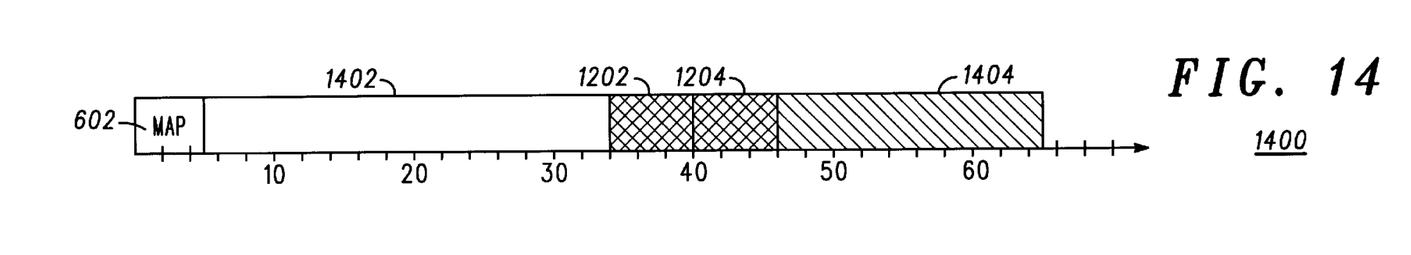
FIG. 14 is an illustration of a completed channel allocation map of FIG. 13.

Referring to FIG. 12, numeral 1200, in the first step, the alternative method provides for the placement of the blocks which are non-paired close to the TDD boundary and then filling outwardly from the TDD boundary. In other words, a non-paired wireless router allocated transmit time or block 1202 is placed close to the TDD boundary, thereby filling the downstream segment of the TDD frame from right to left, and then a non-paired subscriber device allocated transmit time or wireless router allocated receive time or block 1204 is placed close to, but on the other side of the TDD boundary, thereby filling the upstream segment of the TDD frame from left to right. Referring to FIG. 13, numeral 1300, in the second step, the alternative method provides for the placement of the paired blocks 1302 and 1304 in the channel allocation map. Paired blocks for the downstream that are transmitted from the wireless router to the subscriber devices are filled from left to right in the channel allocation map starting at the beginning of the TDD frame, whereas the paired blocks for the upstream that are received at the wireless router from the subscriber devices are filled from left to right in the channel allocation map starting at the end of the non-paired blocks in the upstream/transmit segment of the TDD frame. As shown in FIG. 14, numeral 1400, this alternative method maximizes the distance between the paired blocks.

Referring to FIG. 14, numerals 1402 and 1404 represent the paired allocated receive and transmit times of the associated subscriber devices respectively. In this manner, as shown in FIG. 14 the likelihood that the turn-around time of a subscriber is violated is minimized. In this alternative method the necessity of placing a guard band in the frame for the paired blocks is also taken into account.

Figure 15:
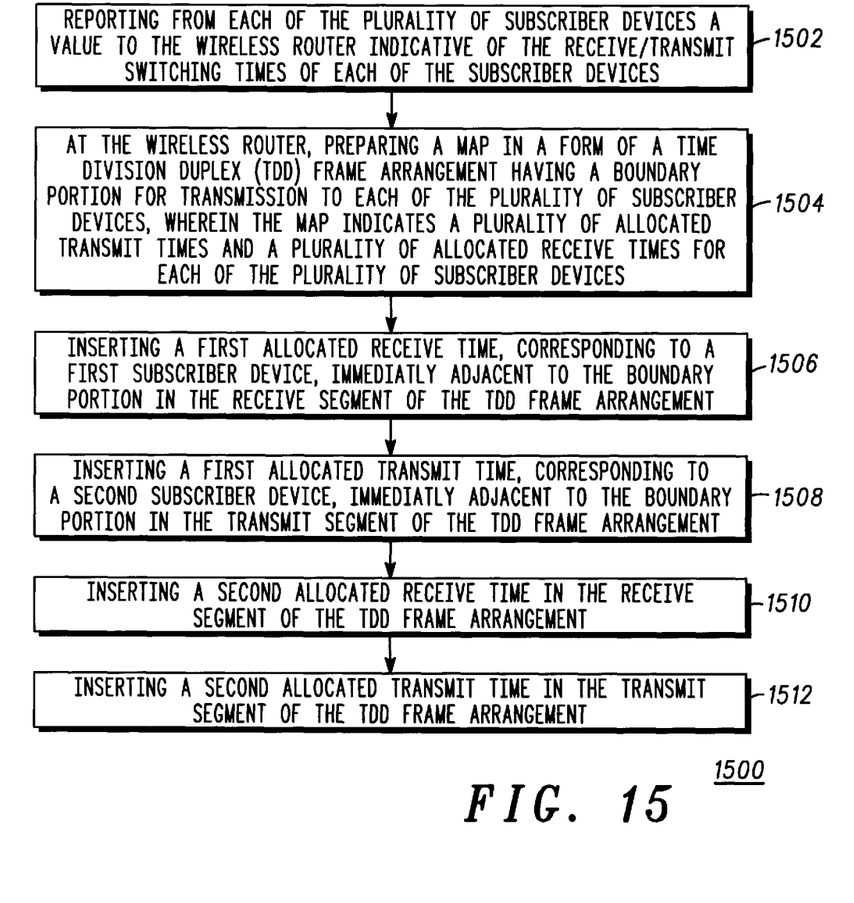
FIG. 15 is a flow chart representation of the steps of an alternative method is accordance with the present invention.

FIG. 15, numeral 1500, is a graphic representation of an embodiment of steps of the alternative method in accordance with the present invention. The method includes the steps of: a) reporting from each of the plurality of subscriber devices a value to the wireless router indicative of the receive/transmit switching times of each of the subscriber devices (1502); b) at the wireless router, preparing a map in a form of a time division duplex (TDD) frame arrangement having a boundary portion for transmission to each of the plurality of subscriber devices, wherein the map indicates a plurality of allocated transmit times and a plurality of allocated receive times for each of the plurality of subscriber devices (1504); c) inserting a first allocated receive time, corresponding to a first subscriber device, immediately adjacent to the boundary portion in the receive segment of the TDD frame arrangement (1506); d) inserting a first allocated transmit time, corresponding to a second subscriber device, immediately adjacent to the boundary portion in the transmit segment of the TDD frame arrangement (1508); e) inserting a second allocated receive time in the receive segment of the TDD frame arrangement (1510); f) inserting a second allocated transmit time in the transmit segment of the TDD frame arrangement (1512).

Figure 16:
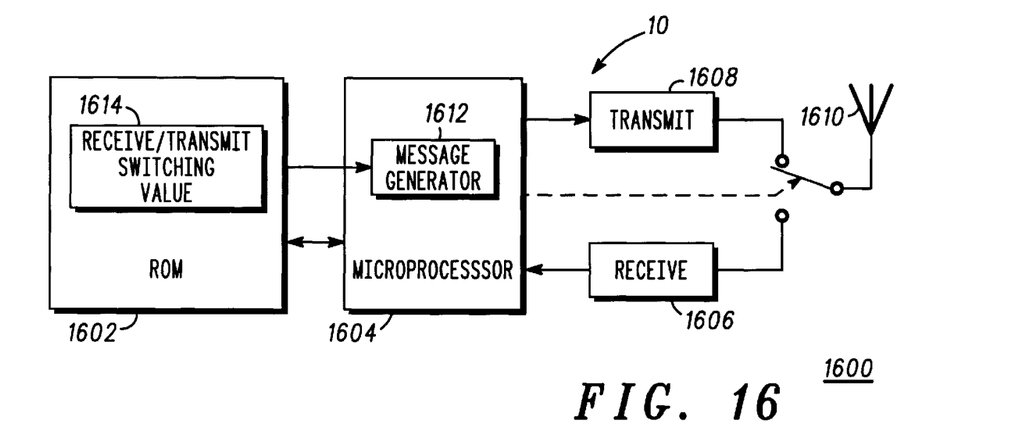
FIG. 16 is a detailed representation of a subscriber device in accordance with the present invention.

FIG. 16, numeral 1600, is a detailed representation of a subscriber device in accordance with the present invention. The subscriber device 10 includes a memory 1602 in a form of a read only memory (ROM), a microprocessor 1604 coupled to the memory 1602, a receiver 1606, a transmitter 1608 for communication with the wireless router through the antenna 1610. The memory 1602 has stored therein the receive/transmit switching value 1614 for the subscriber device and the microprocessor includes a message generator 1612 for generating messages for transmission to the wireless router, one of which is the receive/transmit switching value of the subscriber device.

The above description has been given by way of example only, and modifications of detail can be made by one of ordinary skill in the art without departing from the scope and spirit of the invention.

We claim:

1. A method of operating a communication system having a wireless router and at least a first subscriber device, wherein the first subscriber device has a receiver and a transmitter and a receive/transmit switching time, the method comprising:

reporting a first value from the first subscriber device to the wireless router indicative of the receive/transmit switching time of the first subscriber device;

at the wireless router, preparing a map for transmission to the first subscriber device wherein the map indicates at least a first allocated transmit time, in a form of a block, having a beginning and an end, for transmission by the first subscriber device following a receive time;

checking that the beginning of the at least first allocated transmit time for the first subscriber device is not scheduled before an end of a predetermined time following the receive time, wherein a length of the predetermined time is dependent on the receive/transmit switching time of the first subscriber device;

when the beginning of the at least first allocated transmit time for the first subscriber device is before the end of the predetermined time following the receive time, storing the block on a temporary queue;

after storing the block on the temporary queue, adding a second allocated transmit time to the map for a second subscriber device, wherein the second allocated transmit time is based on a second value reported from the second subscriber device to the wireless router indicative of a receive/transmit switching time of the second subscriber device;

rechecking that the beginning of the first allocated transmit time for the first subscriber device is not scheduled before the end of the predetermined time following the receive time of the first subscriber device; and adding the first allocated transmit time to the map.

2. The method of claim 1, further comprising the step of:

when the beginning of the at least first allocated transmit time for the first subscriber device is before the end of the predetermined time following the receive time, checking whether a time limit for preparing the map is expired.

3. The method of claim 2, further comprising the steps of:

when the time limit is expired, placing a guard band in the map; and inserting the block in the map after the guard band.

4. The method of claim 1, further comprising the step of:

when the map is not full, selecting the block from the temporary queue;

inserting a guard band in the map; and inserting the block in the map after the guard band.

5. A method of operating a communication system having a wireless router and a plurality of subscriber devices, wherein each of the plurality of subscriber devices has a receiver and a transmitter and a receive/transmit switching time, the method comprising:

reporting from each of the plurality of subscriber devices a value to the wireless router indicative of the receive/transmit switching times of each of the subscriber devices at the wireless router, preparing a map in a form of a time division duplex (TDD) frame arrangement having a boundary portion for transmission to each of the plurality of subscriber devices, wherein the map indicates a plurality of allocated transmit times and a plurality of allocated receive times for each of the plurality of subscriber devices;

wherein the boundary portion provides a receive segment and transmit segment in the TDD frame arrangement, the method further comprising the steps of inserting a first allocated receive time, corresponding to a first subscriber device, immediately adjacent to the boundary portion in the receive segment of the TDD frame arrangement and inserting a first allocated transmit time, corresponding to a second subscriber device, immediately adjacent to the boundary portion in the transmit segment of the TDD frame arrangement.

6. The method of claim 5, wherein the boundary portion provides a receive segment and transmit segment in the TDD frame arrangement, the method further comprising the steps of:

inserting a first allocated receive time, corresponding to a first subscriber device, immediately adjacent to the boundary portion in the receive segment of the TDD frame arrangement; and inserting a first allocated transmit time, corresponding to a second subscriber device, immediately adjacent to the boundary portion in the transmit segment of the TDD frame arrangement.

7. The method of claim 5, further comprising the steps of:

inserting a second allocated receive time in the receive segment of the TDD frame arrangement; and inserting a second allocated transmit time in the transmit segment of the TDD frame arrangement.

\* \* \* \* \*